Figures 6, 7:
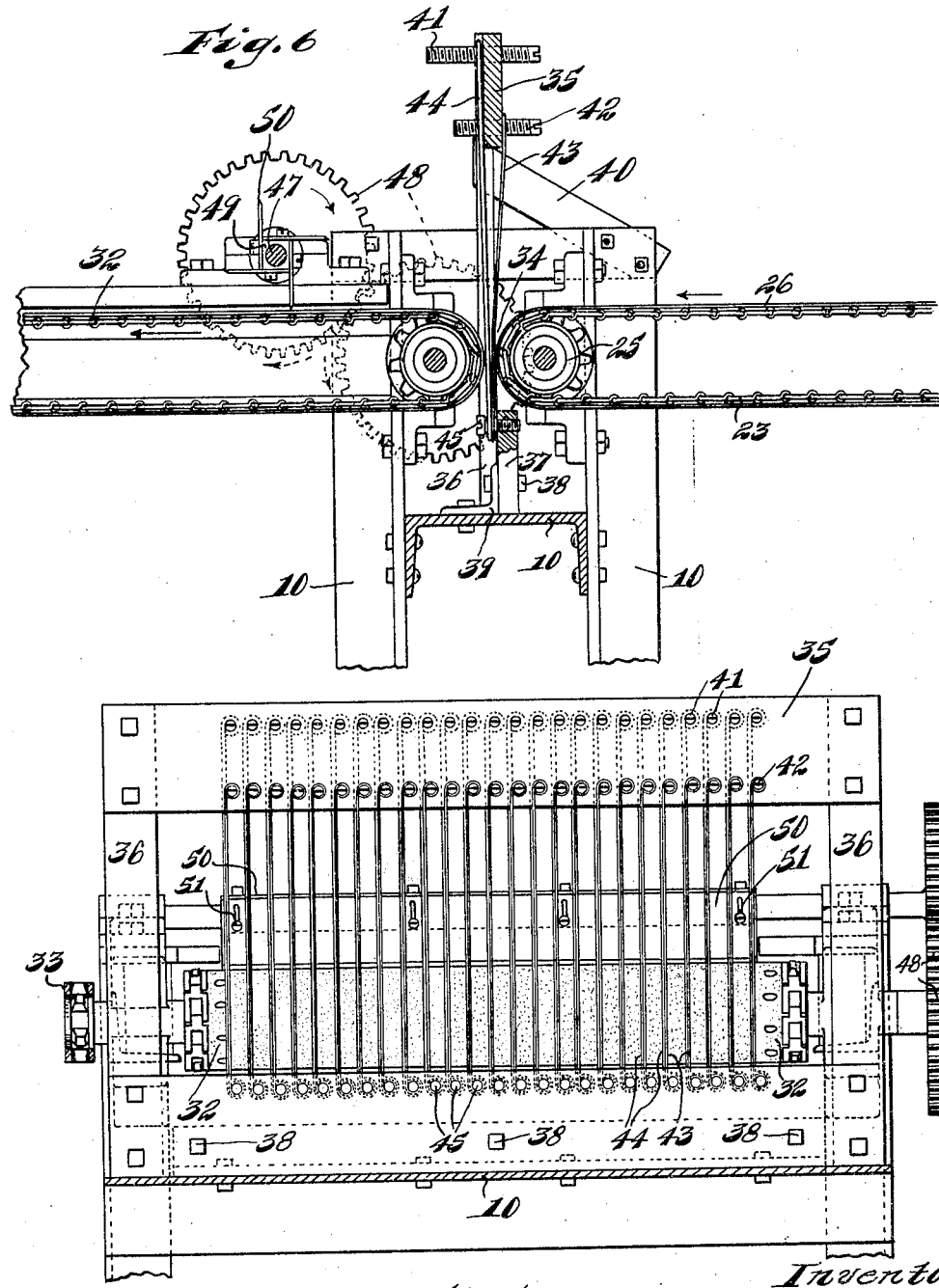

Oct. 23, 1928.
G. SORENSEN
1,688,668
CANDY CUTTING MACHINE
Filed Oct. 4, 1926
4 Sheets-Sheet 1
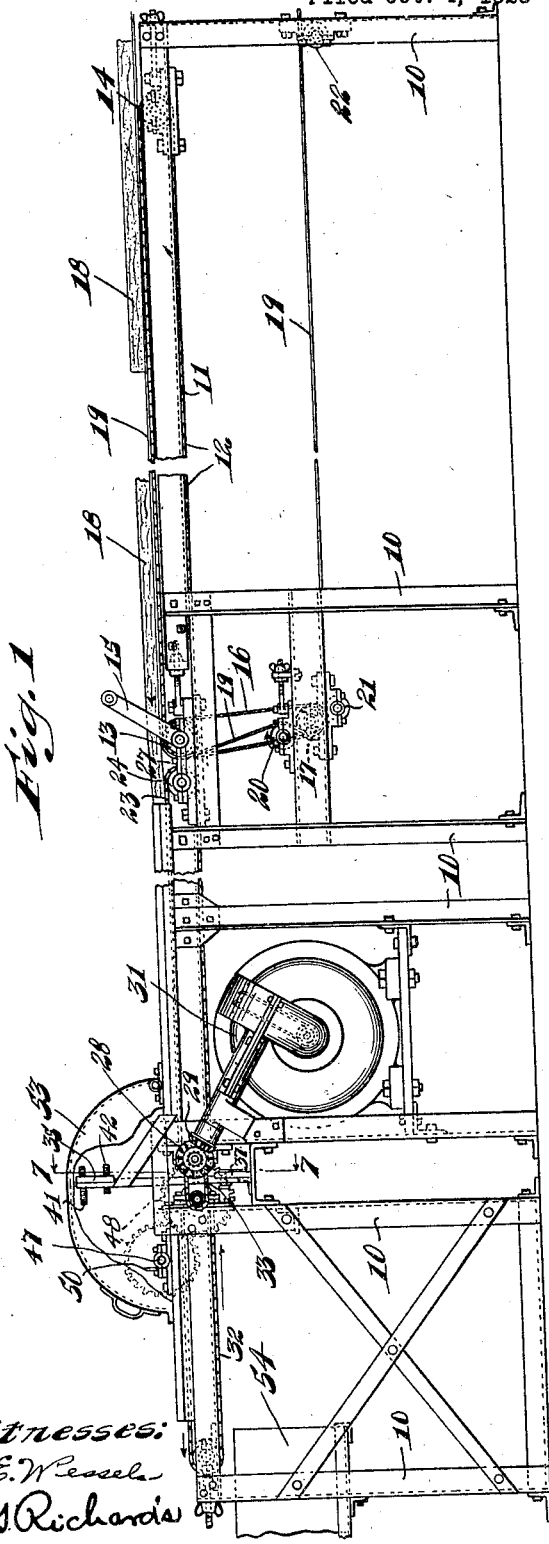
Witnesses:
C. E. Wessels
B. J. Richards
Inventor:
George Sorensen,
By Joshua R. H. Potts
his Attorney.

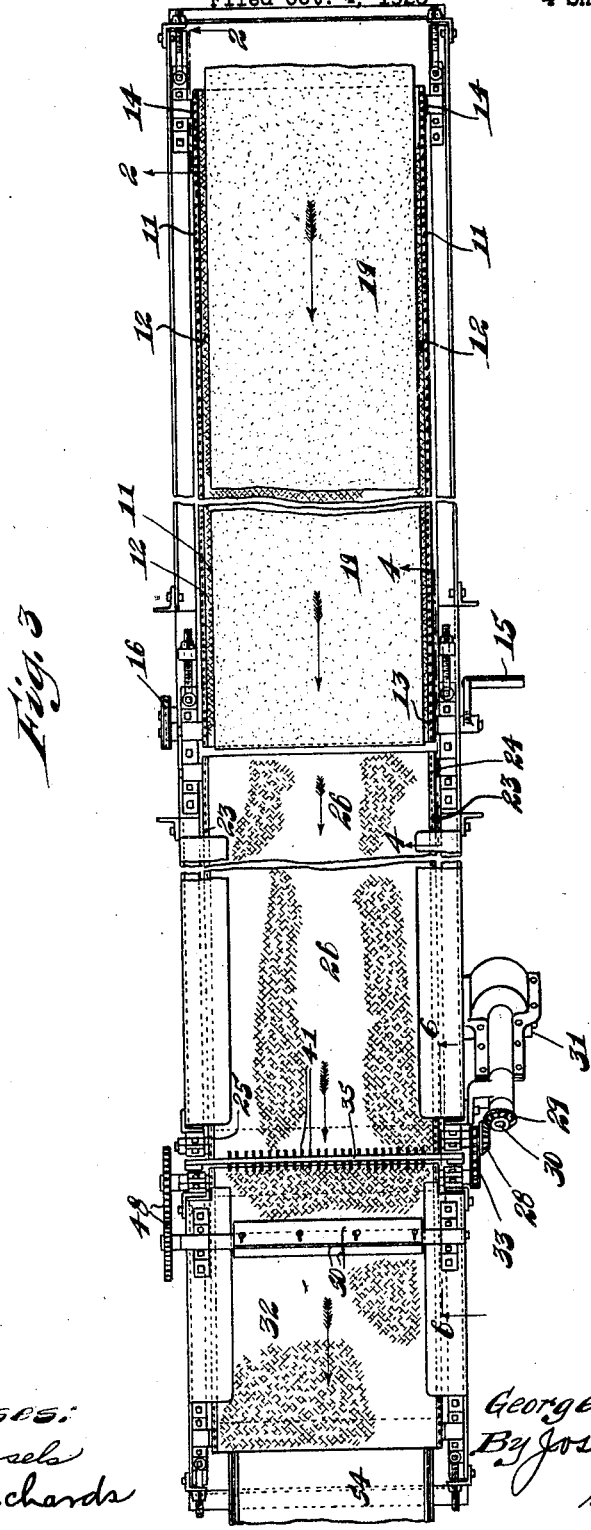

Oct. 23, 1928.
1,688,668
G. SORENSEN
CANDY CUTTING MACHINE
Filed Oct. 4, 1926  4 Sheets-Sheet 3
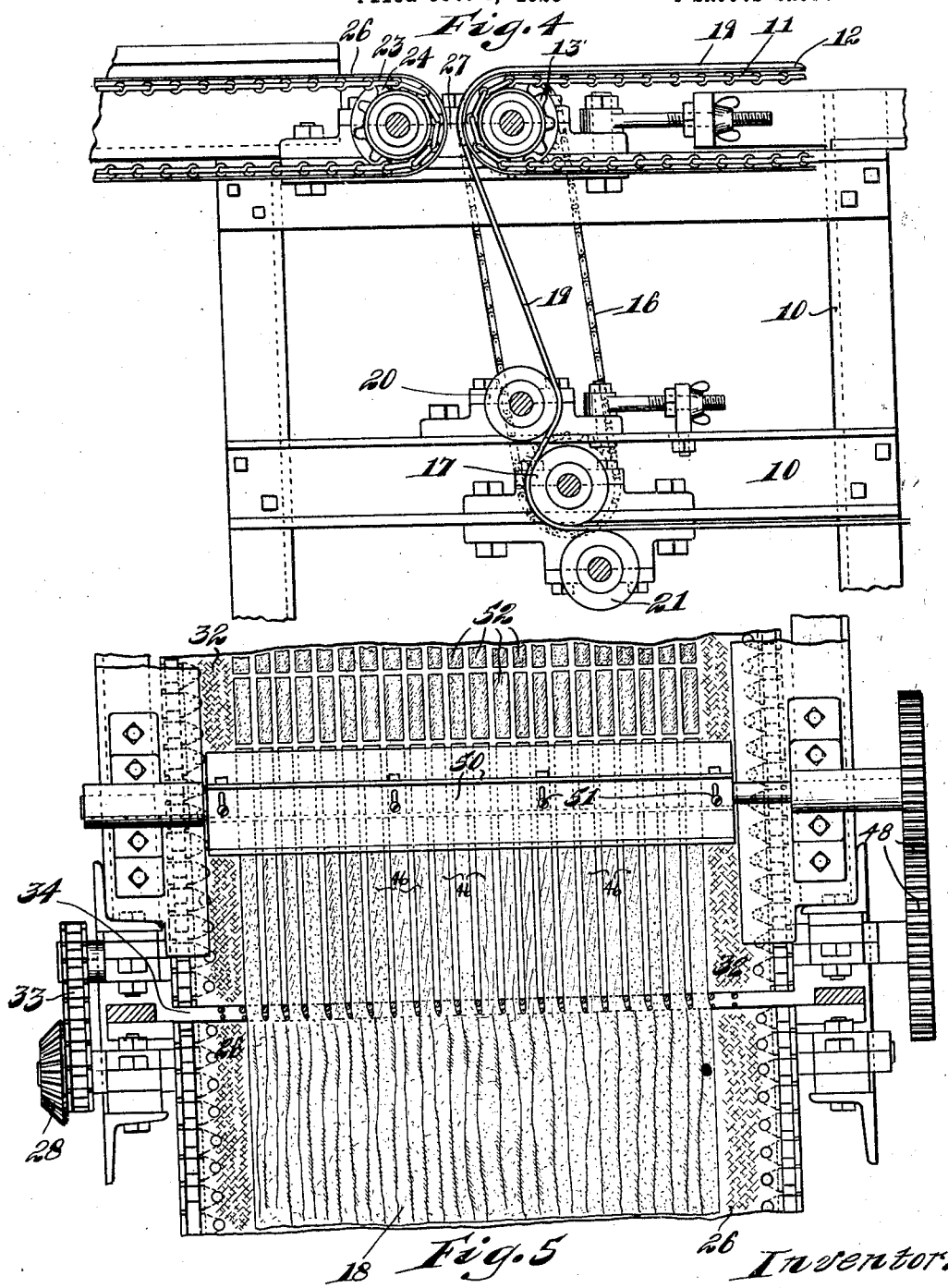
Witnesses:
C. E. Wessels
B. G. Richards
Inventor:
George Sorensen,
By Joshua R. H. Potts.
his Attorney Oct. 23, 1928.  1,688,668
G. SORENSEN
CANDY CUTTING MACHINE
Filed Oct. 4, 1926  4 Sheets-Sheet 4

Witnesses:
C. E. Wessels
B. G. Richards

Inventor:
George Sorensen,
By Joshua R H Potts
his Attorney

Patented Oct. 23, 1928.

1,688,668

UNITED STATES PATENT OFFICE.

GEORGE SORENSEN, OF CHICAGO, ILLINOIS.

CANDY-CUTTING MACHINE.

Application filed October 4, 1926. Serial No. 139,320.

My invention relates to improvements in candy cutting machines and has for its object the provision of an improved construction of this character especially adapted and arranged for cutting candy or similar plastic material, the object of the invention being to provide a simple and efficient machine of this character.

Other objects will appear hereinafter.

The invention consists in the combinations and arrangements of parts hereinafter described and claimed.

The invention will be best understood by reference to the accompanying drawings forming a part of this specification, and in which, Fig. 1 is a partial side view of a machine embodying the invention;

Fig. 2 an enlarged detail section illustrating the mounting of one end of a plurality of conveyers employed in the machine, and taken substantially on line 2—2 of Fig. 3;

Fig. 3 a top plan view corresponding with Fig. 1;

Fig. 4 an enlarged section taken substantially on line 4—4 of Fig. 3;

Fig. 5 an enlarged top plan view, with the enclosing housing removed, of the cutting mechanism of said machine;

Fig. 6 an enlarged section taken substantially on line 6—6 of Fig. 3; and

Fig. 7 an enlarged section taken substantially on line 7—7 of Fig. 1.

The preferred form of construction as illustrated in the drawings comprises a suitable frame 10 having an endless belt conveyer arranged at one end thereof, said conveyer consisting of two parallel chains 11 connected by a strip of canvas 12 and traveling over sprockets 13 and 14 mounted as shown on the frame of the machine. The crank handle 15 is connected with sprockets 13 and whereby said endless belt conveyer may be operated as a feed-in conveyer for the machine, as will be readily understood. The sprockets 13 are connected by a sprocket chain 16 with a withdrawing drum 17 so that said withdrawing drum will be operated simultaneously with said conveyer. The candy to be cut by the machine is in the form of a strip or slab 18 mounted on a strip 19 of flexible material such as paraffin paper, and the strip 19 is arranged to pass from said conveyer over the withdrawing drum 17. Cooperating with the withdrawing drum 17 are guide rollers 20, 21 and 22 for directing the strip 19 from the machine as shown.

Cooperating with the said feed-in conveyer is an intermediate conveyer consisting of chains 23 operating over sprockets 24 and 25 and connected by the canvas strip 26, said intermediate conveyer being in all respects the same as said feed-in conveyer and being set in longitudinal registration therewith with a narrow gap 27 between them. The strip 19 is passed through the gap 27 to the withdrawing roller 17, the strip or slab 18 of the candy spanning said gap and being fed further into the machine by the action of the intermediate conveyer, said conveyers thus operating to strip the sheet 19 from the incoming strip or slab of candy.

The intermediate conveyer is constantly driven by means of a bevel gear 28 meshing with a bevel gear 29 on a shaft 30 driven by an electric motor 31 and whereby said intermediate conveyer is constantly driven at uniform speed.

The intermediate conveyer cooperates with a third conveyer 32 which in all respects is the same as that already described and is driven from the intermediate conveyer by means of a sprocket chain 33 as shown. The intermediate and discharge conveyers are set in longitudinal registration with each other with a gap 34 between them. A cutting frame is arranged in cooperative relationship with the gap 34, said frame comprising an upper horizontal bar 35, vertical side bars 36 and a lower horizontal bar 37, the lower bar 37 being detachably secured by means of bolts 38 to an angle iron bracket 39 on the frame of the machine and whereby a detachable rectangular frame is provided which practically surrounds the gap 34 between said conveyers. A diagonal brace 40 braces the upper portion of said frame to withstand the cutting strains. Tension screws 41 and 42 are arranged in the upper bar 35 of said frame and wires 43 and 44 are secured at their upper ends to said tension screws and at their lower ends to anchoring screws 45 on the bar 37. As shown, the wires 43 and 44 are arranged in registering pairs, the wires 43 being much smaller than the wires 44 and the wires 43 preceding the wires 44 in application to the slab or strip of candy being fed by the intermediate conveyer. By this arrangement it will be noted that as the slab or strip of candy is fed across the gap 34, it will be split into strips 46 by the action of the wires 43 and 44, the finer wires 43 starting the slits for the purpose and the heavier wires 44 widening said slits, as best shown in Fig. 5. Arranged over the discharge conveyer 32 is a cutting shaft 47 driven by gears 48 and having a rectangular cutter head 49 secured thereto. The cutter head 49 carries four adjustable cutter blades 50 adjustably secured thereto by means of the slot and screw connections 51. The arrangement is such that the cutting edges of the blades 50 cooperates with and travel in the same direction and at the same speed as the discharge conveyer 32 and whereby the strips of candy traveling thereon are cut into blocks or bars 52 as shown in Fig. 5. A suitable upwardly swinging housing 53 is arranged over the cutting elements to protect the same and a suitable discharge hopper or box 54 is arranged to receive the blocks or bars of candy automatically discharged from the conveyer 32.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A machine of the class described comprising two conveyers arranged with a gap between them; and cutting wires arranged in registering pairs in said gap, substantially as described.

2. A machine of the class described comprising two endless belt conveyers arranged in longitudinal registration with each other with a gap between them; and cutting wires arranged in registering pairs in said gap, substantially as described.

3. A machine of the class described comprising two conveyers arranged with a gap between them; and cutting wires in said gap, said cutting wires being arranged in registering pairs of different sizes, substantially as described.

4. A machine of the class described comprising two endless belt conveyers arranged in longitudinal registration with each other with a gap between them; a removable frame associated with said conveyers; cutting wires on said frame passing through said gap, said wires being arranged in registering pairs of different sizes, substantially as described.

5. A machine for automatically cutting candy or the like adapted to receive the candy in the form of a slab resting on a flexible sheet, comprising feed-in intermediate and discharge conveyers, said conveyors being arranged in longitudinal registration with each other with gaps between them; withdrawing rollers associated with said first gap and arranged to withdraw said flexible sheet therethrough; and cutting elements arranged in said other gap, substantially as described.

6. A machine for automatically cutting candy or the like adapted to receive candy in the form of a slab resting on a flexible sheet comprising feed-in, intermediate and discharge endless belt conveyors, said conveyors being arranged in longitudinal registration with each other with gaps between them; withdrawing rollers associated with said first gap and arranged to withdraw said flexible sheet therethrough; cutting elements arranged in said other gap; and a revolving cutter head having cutting blades cooperating with said discharge conveyor, said blades being arranged to travel at substantially the same speed and direction of said conveyor, substantially as described.

7. A machine of the class described comprising feed-in, intermediate and discharge endless belt conveyers, said conveyers being arranged in longitudinal registration with each other with gaps between them; withdrawing rollers associated with said first gap and arranged to withdraw a flexible element therethrough; a removable frame associated with said other gap; and cutting wires on said frame extending through said gap, said cutting wires being arranged in registering pairs of different sizes, substantially as described.

8. A machine of the class described comprising feed-in, intermediate and discharge endless belt conveyers, said conveyers being arranged in longitudinal registration with each other with gaps between them; withdrawing rollers associated with said first gap and arranged to withdraw a flexible element therethrough; a removable frame associated with said other gap; cutting wires on said frame extending through said gap, said cutting wires being arranged in registering pairs of different sizes; and a revolving cutter head having cutting blades cooperating with said discharge conveyer, said cutting blades being arranged to travel at substantially the same speed and direction as said conveyer, substantially as described.

9. A machine for automatically cutting candy or the like adapted to receive the candy in the form of a slab resting on a flexible sheet, comprising feed-in, intermediate and discharge conveyors, arranged with gaps between each two; means associated with said first gap for withdrawing said flexible sheet therethrough; cutting elements associated with said other gap; and a revolving cutter head having cutting blades cooperating with said discharge conveyor, substantially as described.

10. A machine of the class described comprising two conveyors arranged with a gap between them; cutting wires in said gap arranged in registering pairs; and a revolving cutter head associated with one conveyor, substantially as described.

11. A machine of the class described comprising feed-in, intermediate and discharge endless belt conveyors, said conveyors being arranged in longitudinal registration with each other with gaps between them; a removable frame associated with one gap; and cutting wires on said frame extending through said gap, said cutting wires being arranged in registering pairs of different sizes, substantially as described.

12. A machine of the class described comprising feed-in, intermediate and discharge endless belt conveyors, said conveyors being arranged in longitudinal registration with each other with gaps between them; a removable frame associated with one of said gaps; cutting wires on said frame extending through said gap, said cutting wires being arranged in registering pairs of different sizes; and a revolving cutter head having cutting blades cooperating with said discharge conveyor, said cutting blades being arranged to travel at substantially the same speed and direction as said conveyor, substantially as described.

In testimony whereof I have signed my name to this specification.

GEORGE SORENSEN.